United States Patent [19]
Collins, Jr.

[11] Patent Number: 5,934,626
[45] Date of Patent: Aug. 10, 1999

[54] ADJUSTABLE PIPE ROLL AND SUPPORT MECHANISM

[75] Inventor: Robert H. Collins, Jr., Houston, Tex.

[73] Assignee: Sumner Manufacturing Company, Inc., Houston, Tex.

[21] Appl. No.: 08/991,575

[22] Filed: Dec. 16, 1997

[51] Int. Cl.[6] ....................................................... A47J 47/16
[52] U.S. Cl. ................................... 248/132; 269/289 MR
[58] Field of Search ................................. 248/132, 158, 248/163.2, 166, 177.1, 351, 357; 269/289 MR, 242

[56] References Cited

U.S. PATENT DOCUMENTS

| | | |
|---|---|---|
| 1,024,860 | 4/1912 | Kline . |
| 1,579,002 | 3/1926 | Kock . |
| 1,681,192 | 8/1928 | McBride . |
| 2,297,316 | 9/1942 | Padgett ..................................... 248/166 |
| 2,468,160 | 4/1949 | Benson . |
| 3,313,505 | 4/1967 | Petrie . |
| 3,588,023 | 6/1971 | Cohen . |
| 3,908,318 | 9/1975 | Wallin . |
| 4,221,363 | 9/1980 | Jasper . |
| 4,928,916 | 5/1990 | Molloy . |
| 5,137,235 | 8/1992 | Wentworth .......................... 248/132 X |
| 5,297,779 | 3/1994 | Collins, Jr. et al. . |
| 5,299,656 | 4/1994 | Grill ................................. 269/289 MR |
| 5,337,875 | 8/1994 | Lee ............................... 269/289 MR X |

FOREIGN PATENT DOCUMENTS

| | | |
|---|---|---|
| 376063 | 7/1932 | United Kingdom . |
| 530505 | 12/1940 | United Kingdom . |
| 1230843 | 5/1971 | United Kingdom . |

*Primary Examiner*—Ramon O. Ramirez
*Attorney, Agent, or Firm*—Bush, Riddle & Jackson L.L.P.

[57] ABSTRACT

An adjustable roll and support mechanism for elongate objects having a round cross-sectional configuration has a support base having a pair of parallel upright tubular members having rigid or collapsible support legs. Elevation posts are positioned in movable telescoping relation within respective tubular members and support a roll positioning head having an internal roll positioning mechanism. A pair of roll assemblies are movably supported on the roll positioning head and have driven relation by the roll positioning mechanism and are moved toward one another or away from one another for selective positioning of the roll assemblies for rotatable support of round objects of differing dimension. The roll assemblies are connected to the roll positioning mechanism by quick disconnect mechanisms to permit the roll assemblies to be changed out to accommodate rotatable support of different types of objects.

27 Claims, 5 Drawing Sheets

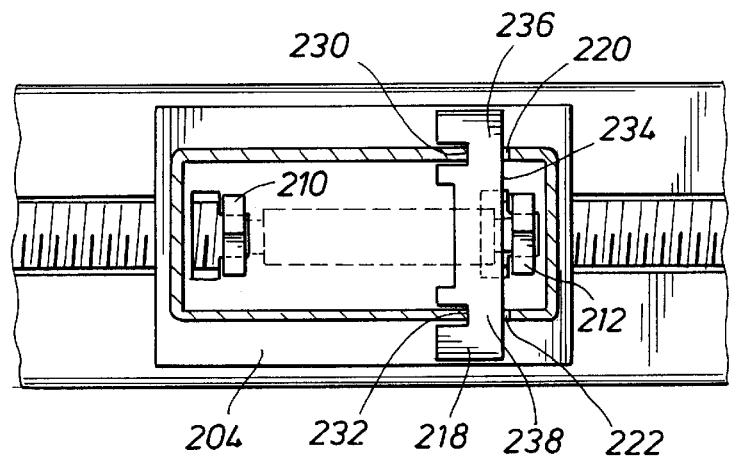
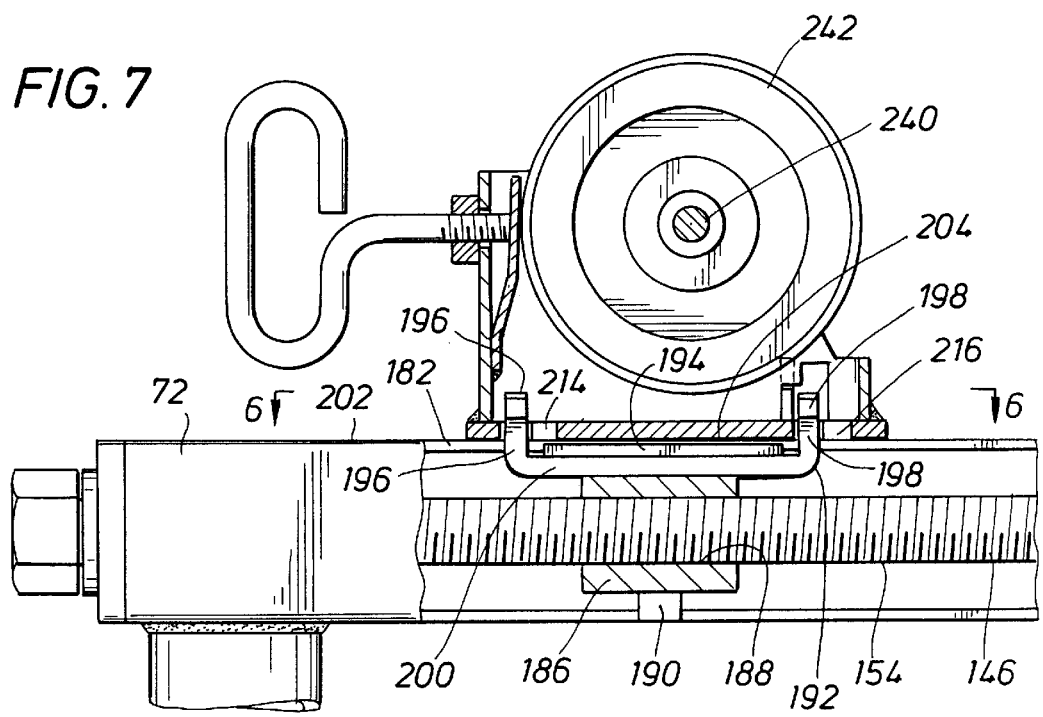
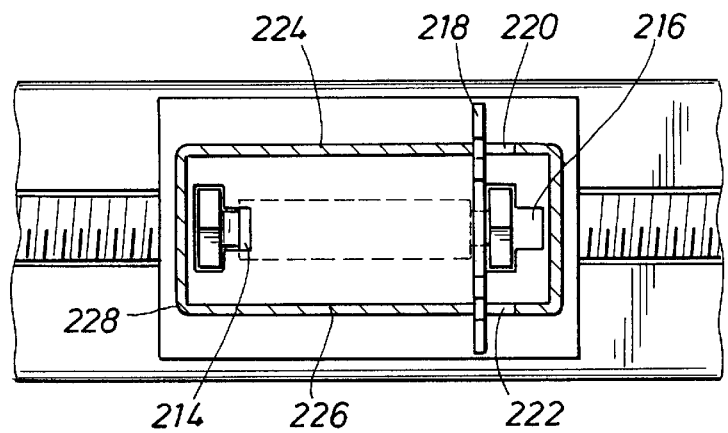

ADJUSTABLE PIPE ROLL AND SUPPORT MECHANISM

BACKGROUND OF THE INVENTION

1. Field of the Invention

This invention relates generally to pipe jacks and supports such as are typically utilized for support of pipe and other elongate members in horizontally oriented manner to facilitate welding and other operations. More particularly the present invention concerns a support mechanism having a support base structure that may be collapsible for ease of storage and handling and which is provided with quick-disconnect type removable support roll assemblies that have lateral spacing adjustment to accommodate pipes and other round objects of differing dimension and incorporate a brake to enable selective rotary positioning of a work-piece rotatably supported thereby. This invention also concerns pipe roll and support mechanisms having height adjustment to provide for selective elevation and rotatable support of loads and having a locking mechanism to ensure against inadvertent downward movement of the roll assemblies and the load supported thereby.

2. Description of the Prior Art

The term "pipe roll" as used herein is intended to mean support devices having roll assemblies to provide rotatable support for pipes, poles and any other object having a cylindrical outer peripheral surface and which is intended to be rotatably supported generally horizontally to enable various work to be performed on it. Various types of devices for rotatable support of pipe and various other elongate objects of round cross-sectional configuration have been developed. These support devices, typically referred to as pipe rolls and supports, generally comprise a support structure having legs and further having a roll support member at the upper portion on which is mounted a pair of rollers that provide rotatable support for the pipe or other object being supported. In some cases the roll assemblies of the support device are selectively positionable to enable the support device for efficient support of round objects of differing dimension.

Though pipe rolls are quite advantageous to the construction industry and commercial servicing industry to enable round objects to be efficiently positioned for the performance of work thereon, when pipe rolls are not being used they represent impediments in the work environment because they are difficult and inconvenient to store. Moreover, when pipe rolls are being transported or stored, they typically require considerable space because of their typically fixed geometry. It is considered desirable to provide pipe rolls that are collapsible so that, when they are not needed for rotatable support of work-pieces, they can be easily stored without requiring an unusually large storage facility. Also, pipe rolls that are collapsible can be more efficiently handled and shipped.

Many pipe rolls have selective incremental height adjustment by providing locking pins or bolts that are received within registering apertures in load elevating components. It is desirable to provide for selective height adjustment of rotatably supported loads wherein the pipe roll mechanism is quickly and efficiently adjustable to any selected elevation between maximum and minimum limits.

In many cases the load being rotatably supported by a pipe roll requires roll assemblies that are composed of a material that will not damage the cylindrical outer surface of the load. When specific roller material is required (rubber or polymer rollers for example) for rotatably supporting particular objects it is typically necessary to partially disassemble the pipe roll and replace the rollers of the roll assemblies. This is a time consuming and expensive process not only from the standpoint of labor, but also because of the rollers and other materials that are replaced and are often lost or misplaced so that they are not again usable. If the roll assemblies of pipe rolls are of adjustable to accommodate loads of differing dimension it is even more difficult and impractical to replace the rollers to accommodate rotatable support of particular objects. For these reasons, to provide for efficient support of differing work-pieces, it is considered more practical, though considerably more expensive, to provide different pipe roll devices for support of specific objects. It is desirable therefore to provide an adjustable pipe roll mechanism having roll assemblies that are simply and quickly interchangeable so that pipe rolls can be converted for efficient support of objects that require particular types of rollers to minimize the potential for marring or otherwise damaging the outer cylindrical surface of the object being engaged and supported by the rollers of a roll assembly.

Many types of pipe jacks are provided with friction type locking rings to facilitate a wide range of elevational adjustment between minimum and maximum work-piece elevations. In some cases, to achieve unlocking or release of lock rings, workers must release the load acting thereof and then manually manipulate the locking rings to the release positions thereof before the load is lowered. If the locking rings should slip for any reason or if the pipe jack should fall, there is potential for injury to the hands of the worker. U.S. Pat. No. 3,588,023 and U.S. Pat. No. 5,297,779 each provide apparatus that ensure protection for the hands and fingers of workers when the lock rings of pipe jacks are released. It is desirable therefore to provide pipe roll mechanisms with a lock ring unlocking system that ensures that the hands of the workers are always located away from the locking ring or rings as the lock rings are being moved to the unlocking or release positions thereof.

SUMMARY OF THE INVENTION

It is a principal feature of the present invention to provide a novel adjustable pipe roll and support mechanism that may be of collapsible nature to provide for efficient storage or handling thereof when not being used for rotatable support of objects.

It is another feature of the present invention to provide a novel adjustable pipe roll and support mechanism that may have a fixed base structure or a collapsible base structure depending upon characteristics that are desired in the work environment.

It is an even further feature of the present invention to provide a novel adjustable pipe roll and support mechanism that incorporates adjustable roll assemblies that are quickly and efficiently detachable from the pipe roll mechanism and are thus efficiently replaceable as desired for proper support of specific objects; and.

It is also a feature of the present invention to provide a novel adjustable pipe roll and support mechanism having lock rings interacting with telescopically movable load elevation posts for selectively adjusting the height of work-pieces being rotatably supported by the adjustable pipe roll and support mechanism.

Briefly, the various objects and features of the present invention are realized by providing an adjustable pipe roll and support mechanism having a pair of generally parallel, generally vertically oriented tubular elements that are structurally interconnected to define components of a support base. The support base may be provided with fixed support legs or, to facilitate efficient handling, storage and transportation, may be provided with collapsible support legs, there being two angularly oriented support legs for each of the tubular elements. A support frame having a roll support head and generally parallel elevation posts is disposed in elevating assembly with the support base. The elevation posts are telescopically received within respective tubular elements and are vertically adjustable by friction lock ring assemblies. A lock release mechanism is provided for the pipe roll mechanism which permits workers to release the friction locking rings without necessitating positioning the hands or fingers of workers at locations where injuries might occur if the elevation posts should be released and suddenly fall. The elevation posts are fixed to the end portions of a support head on which is mounted a pair of roll assemblies having adjustable spacing for support of objects of differing dimension. The roll assemblies are provided with a quick-release connection with the roll positioning mechanism of the support structure to thus enable the roll assemblies to be quickly and efficiently changed out as desired for efficient protective rotatable support of particular objects.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is an elevational view of an adjustable pipe roll and support mechanism constructed in accordance with the present invention and showing a preferred embodiment of the invention, with parts thereof broken away and shown in section;

FIG. 2 is a plan view of the adjustable pipe roll and support mechanism of FIG. 1 showing the fully extended condition of the collapsible legs thereof;

FIG. 3 is an elevational view of the adjustable pipe roll and support mechanism of FIGS. 1 and 2, showing the fully collapsed condition of the collapsible legs thereof and showing the elevation control lock rings thereof in their release positions;

FIG. 4 is a partial sectional view showing a portion of the support frame structure of FIGS. 1–3 and showing a roll assembly in operative relation with the roll positioning mechanism and with the roll brake in its release position;

FIG. 5 is a sectional view taken along line 5—5 of FIG. 4;

FIG. 6 is a sectional view taken along line 6—6 of FIG. 4 and showing the roll assembly mechanism there disposed in its locked and operative condition;

FIG. 7 is a partial elevational view of the support frame structure having parts thereof broken away and shown in section and presenting the roll assembly mechanism with the latch mechanism in its latched condition and with the roll brake in its braking position;

FIG. 8 is a sectional view taken along line 8—8 of FIG. 7; and

FIG. 9 is a partial elevational view of an alternative embodiment of the present invention wherein the base structure is provided with fixed legs and provides elevating support for the support frame and is provided with adjustable and releasable roll assemblies in the same manner as set forth in FIGS. 1–8.

DETAILED DESCRIPTION OF PREFERRED EMBODIMENT

Figure 1:
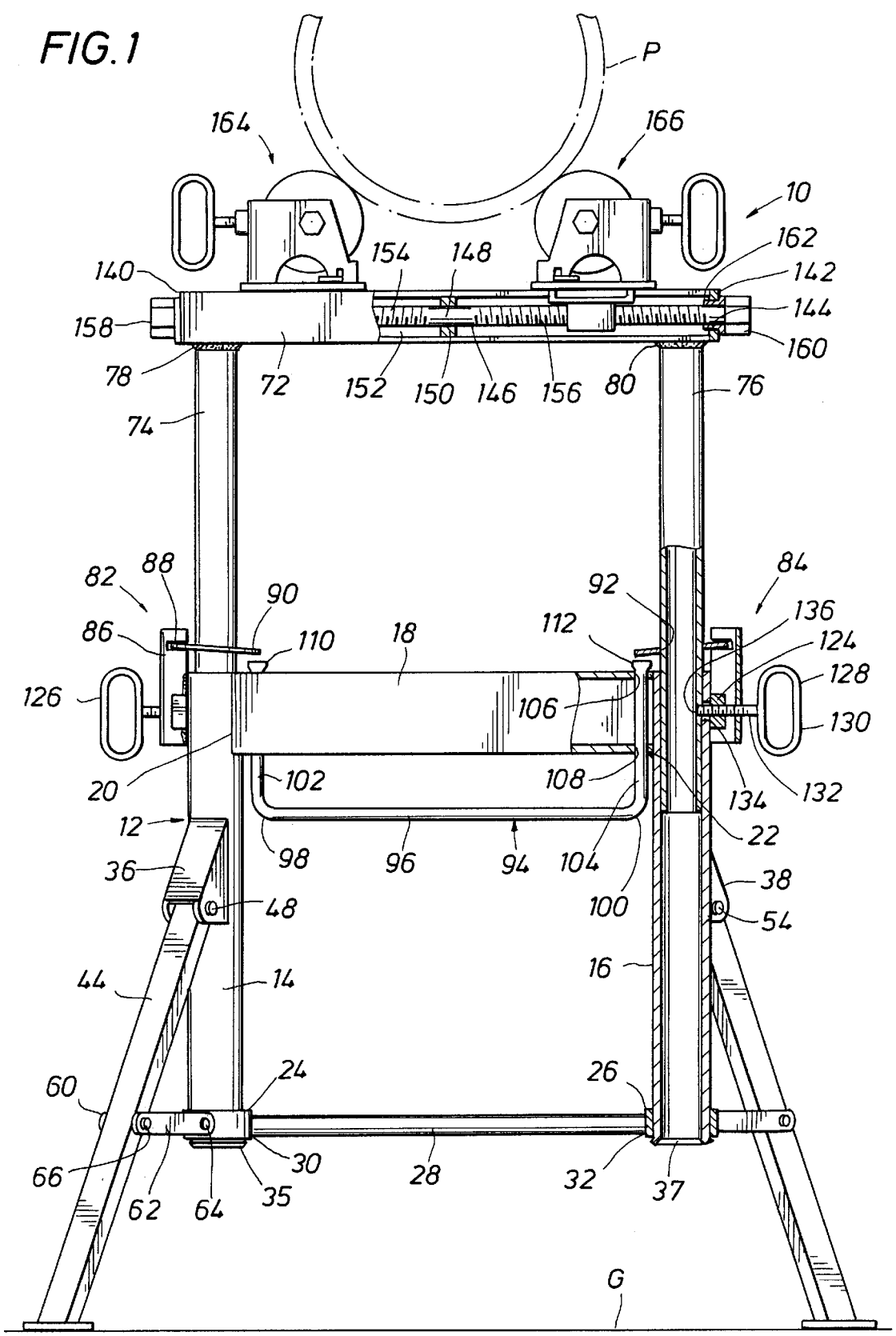

Referring now to the drawings and first to FIG. 1, an adjustable pipe roll and support mechanism constructed in accordance with the present invention is illustrated generally at 10 and comprises a base structure shown generally at 12. The base structure is defined by a pair of vertically oriented, generally parallel tubular members 14 and 16 that are interconnected at the upper end portions thereof by a transverse structural member 18 having its ends 20 and 22 respectively fixed by welding or by any other suitable means of connection to the respective tubular members 14 and 16. At the lower ends of the tubular members a pair stabilizer rings 24 and 26 are moveably disposed about the tubular members and are interconnected by a generally horizontally oriented stabilizer bar 28 having the respective ends 30 and 32 thereof fixed to the respective stabilizer rings by welding or by any other suitable means of rigid connection. The bottom ends 35 and 37 of the tubular members are belled as shown or are otherwise formed to define stop shoulders that retain the respective stabilizer rings in assembly about the tubular members. Thus, the stabilizer rings 24 and 26 can move upwardly from the position shown in FIG. 1, but are prevented from moving downwardly by the down-stop shoulders 35 and 37 that are defined by the belled lower ends of the tubular members.

Figure 2:
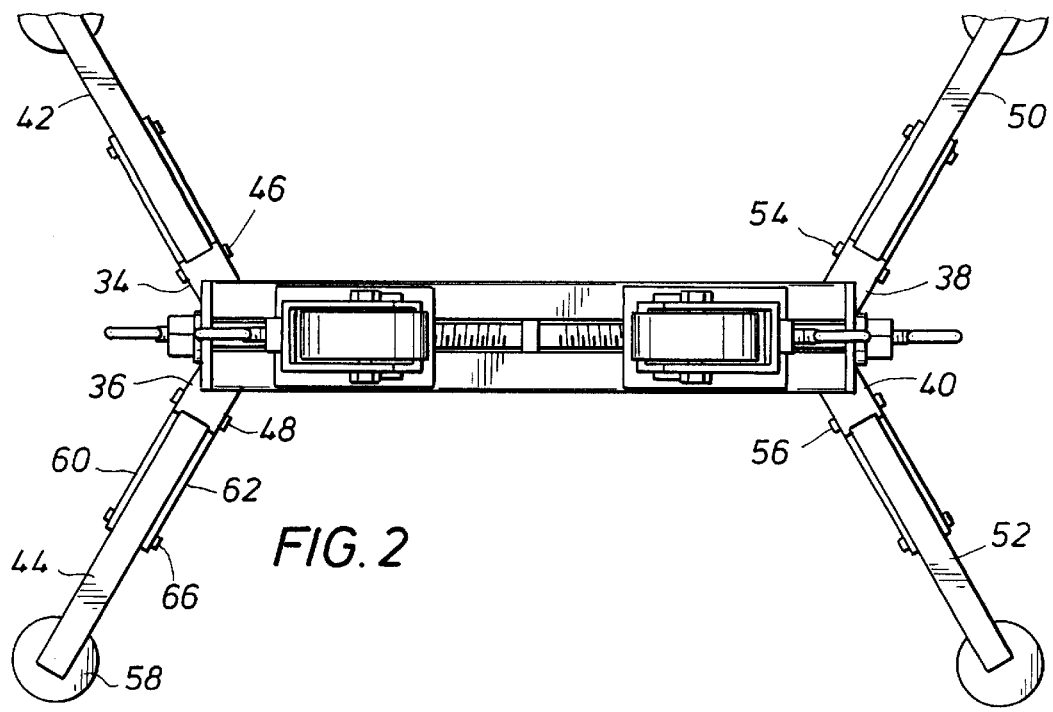
Figure 3:
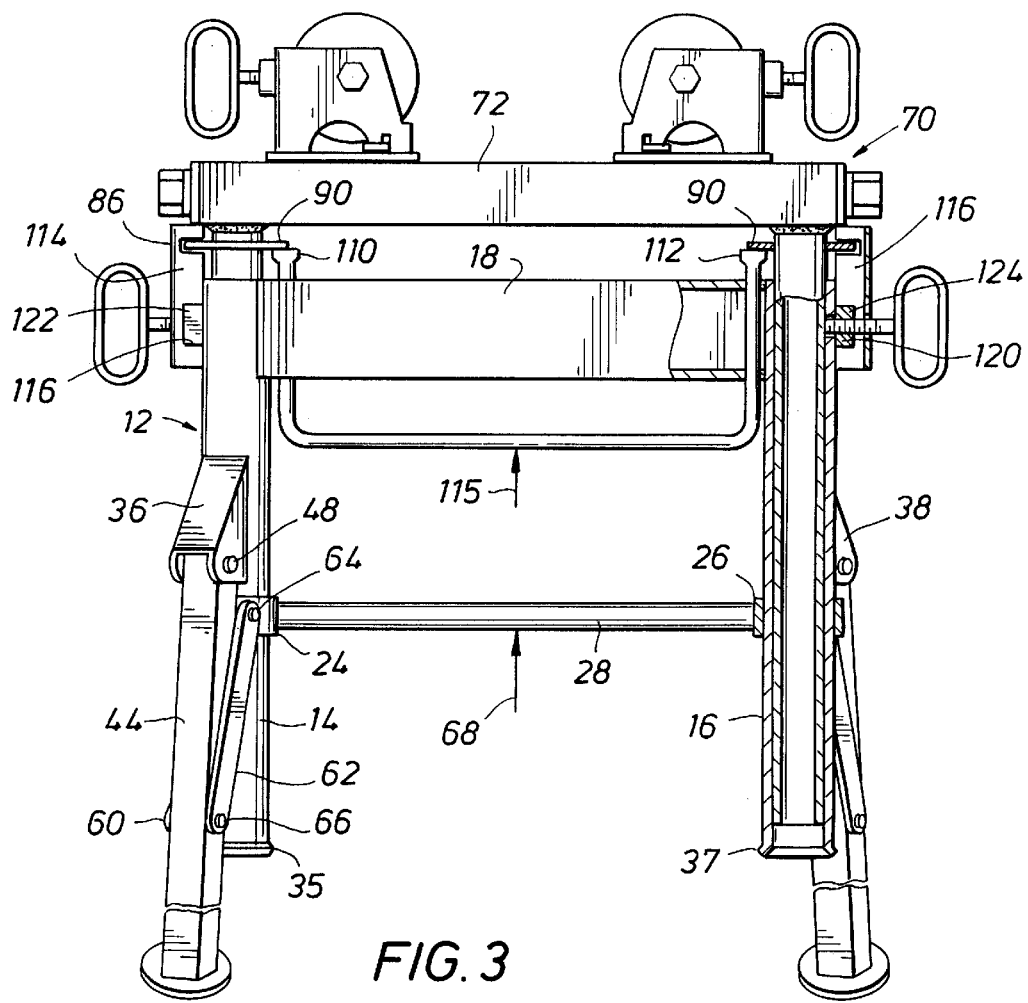
Figure 9:
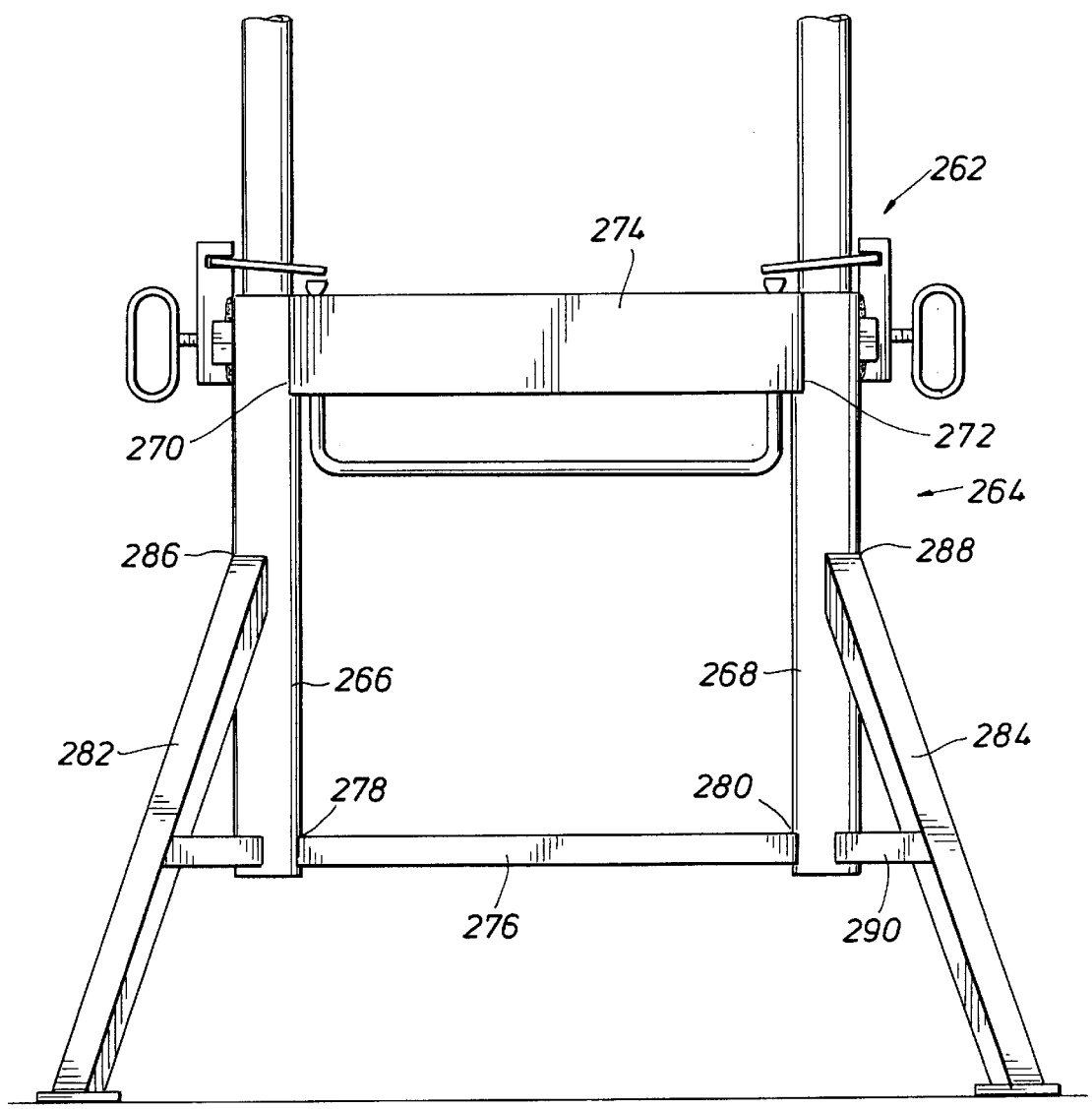

It should be borne in mind that the base structure may have collapsible legs as shown FIGS. 1–3 so as to enable the adjustable pipe roll and support mechanism to be collapsed for ease of efficient storage and handling or to be extended as shown in FIGS. 1 and 2 to facilitate stabilized rotatable support of an object of round cross-sectional configuration, such as the pipe partially shown in broken line at "P". In the alternative, the base structure 12 may be provided with fixed support legs as shown in FIG. 9 hereof and discussed in detail hereinbelow.

Referring now again to FIGS. 1–3 the collapsible leg embodiment of the present invention incorporates a pair of generally triangular leg mounts 34 and 36 which are fixed by welding to the tubular member 14 and are deposed in angularly offset relation with one another as is evident from FIG. 2. Likewise, a pair of leg mounts 38 and 40 are similarly fixed to the tubular member 16 as shown in FIGS. 1–3 and are positioned in angularly offset relation with one another. Base support legs 42 and 44 are moveably connected at the upper ends thereof to respective pivot mounts 34 and 36 by means of pivot connectors 46 and 48. To the leg mounts 38 and 40 are pivotally connected a pair of support legs 50 and 52 having the upper ends thereof secured to the leg mounts by pivot connectors 54 and 56. The lower end of each of the collapsible legs is provided with a foot member such is shown at 58 which is welded or otherwise fixed to the lower end of the respective support leg. Each foot member maybe of circular configuration as is evident from FIGS. 2 and 3 but may have any other suitable configuration without departing from the spirit and scope of this invention.

For positioning support and stabilization of each of the collapsible legs of the base structure 12 a pair of connector links are provided for each leg as shown at 60 and 62. These connector links are connected by pivots 64 to the stabilizer ring 24 and are connected by pivots 66 at pivot points located intermediate the respective ends of the collapsible support legs. The respective pivots 64 and 66 may conveniently take the form of rivet pins or bolt and nut assemblies which extend through aligned apertures of the respective collapsible support legs and function to secure both of the connector links for each leg in pivotal assembles with the leg structure. Likewise, at the opposite ends of each of the connector links 62 the pivots 64 extend through apertures of the connector links and also extend through connection apertures of external bosses that are fixed to or defined by the respective stabilizer rings. Consequently, as the collapsible legs 44 are moved form the extended positions thereof shown in FIG. 1 toward the collapsed position shown in FIG. 3, the stabilizer rings and stabilizer bar 28 will move upwardly, the stabilizer rings 24 sliding along the length of the tubular members 14 and 16 to the fully collapsed positions of the support legs as shown in FIG. 3. Thus, collapsing movement of the support leg assembly of the base structure 12 is achieved by application of upward force on the stabilizer bar 28 as shown by the force arrow 68. Conversely, in order to achieve movement of the collapsible support legs 44 from the collapsed position toward the fully extended position shown in FIG. 1, a downward force is applied to the stabilizer bar 28 thus moving the stabilizer rings 24 and 26 downwardly along the outer surface of the tubular members until the circular down stops 35 and 37 are engaged by the stabilizer rings.

To the collapsible base structure 12 there is provided a work-piece support frame shown generally at 70 which is disposed in vertically moveable assembly with the base structure and is selectively positioned from the standpoint of elevation to position a work-piece at a selected height. The support frame 70 comprises a generally horizontally oriented support member or head 72 which is of a configuration defining an internal chamber or passage. At respective ends of the support head 72 a pair of cylindrical elevation post members 74 and 76 are fixed such as by welds 78 and 80. The cylindrical elevation post members 74 and 76 define support members that are vertically positionable relative to the base structure for the purpose of positioning the pipe "P" or other object at a desired height above the ground or floor surface "G". The cylindrical elevation post members 74 and 76 are positioned in telescoping relation within the tubular members 14 and 16 and are thus stabilized by the base structure 12. For securing the cylindrical elevation post members at selected positions relative to the base structure with sufficient retention force to support the load of the pipe "P" and the weight of the support frame a pair of locking assemblies shown generally at 82 and 84 are provided at the upper end portion of the base structure. These locking assemblies are each defined by lock control members 86 that are fixed by welding to the respective upper ends of the tubular members 14 and 16. The lock control members define lock ring control slots 88 within which is located a peripheral portion of a friction type lock ring 90 that is moveably positioned about the respective cylindrical elevation post members 34 and 76. The lock rings 90 define a central opening 92 of a dimension, relative to the external dimension of the respective inner tubular member, so that, with the lock ring positioned in normal relation with the respective elevation post member, relative linear movement is permitted between the lock ring and the elevation post member, thus allowing the elevation posts to be moved upwardly or downwardly relative to the tubular elements. When the lock ring becomes disposed in angular relation with the respective cylindrical elevation post member as shown in FIG. 1 a frictional binding of the lock ring to the respective cylindrical elevation post member occurs which prevents downward linear movement of the cylindrical elevation post member and lock ring. This frictional locking or binding retention occurs as downward force of the support frame, caused by the weight of the support frame and the weight of any load being applied thereto, is transferred downwardly from the support head through the cylindrical elevation post members 74 and 76. Since a peripheral portion of each of the lock rings is retained within the respective locking control slot 88 at only one side portion of each lock ring, the lock ring will naturally assume an angular, locking position as shown in FIG. 1 so that the downward load on the cylindrical elevation post members will be resisted by the frictional binding activity of the lock rings. When upward force is applied to the support frame for raising the support frame to a desired elevation relative to the base structure, the lock rings 90 will be moved slightly toward a normal position relative to the elevation posts, releasing frictional binding with the elevation posts and allowing the support frame to be easily raised. As soon as this frame raising force is dissipating however, and a downward force is applied to the cylindrical elevation post members, even as little downward force as that caused by the weight of the support frame, the lock rings 90 will immediately bind to the cylindrical elevation post members and will thus restrain the elevation posts and thus the support frame against further downward movement. The locking control elements restrain one side of each lock ring so that elevation post movement causes locking and unlocking movement of the lock rings.

In the event the lock rings 90 should become bound to the elevation post members and it is desired to lower the support frame, the lock rings can be actuated to the release positions thereof shown in FIG. 3 by a lock ring actuator shown generally at 94. The lock ring actuator defines a generally horizontally orientated actuator rod 96 which is bent at 98 and 100 to define generally parallel actuator rod sections 102 and 104 that extend through upper and lower registering apertures 106 and 108 at each side of the transverse structural element 18. These actuator rod sections define enlarged heads 110 and 112 respectively that secure the lock ring actuator in vertically movable assembly with the transverse structural element 18. The length of the actuator rod sections 102 and 104, as compared with the vertical width of the transverse structural element 18, thus permits the lock ring actuator 94 to be moved upwardly from the position shown in FIG. 1 to a lock ring release position shown in FIG. 3, as evidenced by the movement arrow 115 where the enlarged heads 110 and 112 of the actuator rod sections are positioned to engage and orient the respective lock rings 90 in normal relation with the cylindrical elevation post members to thus release frictional or binding engagement of the lock rings with the elevation posts and permit the support frame 70 to be either raised or lowered as desired relative to the base structure 12.

Each of the lock control elements 86 delines parallel side panels such as shown at 114 and 116, which side panels are disposed in substantially parallel, spaced relation. Each of the side panels defines retainer openings such as shown 118 and 120 within which are captured lock nut members 122 and 124 respectively. Lock actuators 126 and 128 are provided, each having an actuating handle 130 with an externally threaded lock pin 132 projecting from the handle and being of sufficient length to be received by the internal threads of the respective lock nut 122 or 124. The inner end of the lock pin 132 extends through an opening 134 defined by each tubular member and projects into a lock opening 136 of the respective cylindrical elevation post member. The cylindrical elevation post members may be provided with a number of spaced lock openings such is shown at 136 to thus enable positive locking of the elevation posts and tubular members against relative linear movement. It should be borne in mind that the inner end of the threaded lock pin may simply establish positive locking engagement with the respective cylindrical elevation post member by applying sufficient locking force to the actuating handles 130 of the lock actuators 128. The lock nuts 122 and 124 can be retained loosely within the respective openings 118 and 120, it only being necessary that the lock nuts be prevented from rotation by the lock control member. Thus the lock nuts are simply entrapped within their respective receptacles and, upon removal of the lock pins 132 from threaded engagement therewith, the lock nuts may be simply removed laterally from the respective lock nut receptacles if replacement of thereof is desired.

When round objects such as pipes are supported for rotation by the pipe support apparatus of this invention it is appropriate that the spacing of the rollers supporting the pipe be adjustable for pipe of differing sizes. It is also desirable that the roller devices supporting the pipe for rotation be of a character for optimum support of the pipe and that they be capable of quickly being changed depending upon the character of the object being supported. It is also desirable to insure that the rollers for supporting the round object have a locking capably so that the object can be stabilized after it has been rotatably positioned. All of these desirable features are achieved by the provision of a support head or member having adjustable and interchangeable roll assemblies and having a roll positioning mechanism for selectively spacing the roll assemblies to accommodate the dimension of the object being rotatably supported. The support member or head 72 is of hollow or of generally tubular configuration and is shown to be of rectangular cross-sectional configuration though this configuration is not intended to limit the spirit and scope of this invention. The support head 72 is provided with end walls 140 and 142 each defining an aperture 144. A roll adjustment shaft 146 is located within the support member 72, with its intermediate, cylindrical portion 148 being supported by a bushing member 150 that is fixed within the internal chamber 152 of the support head. The roll adjustment shaft 146 is provided with external threaded sections 154 and 156 that extend from the intermediate non-threaded cylindrical section 148 to the respective end walls 140 and 142 of the support member. These threaded sections of the roll adjustment shaft 146 are of opposite thread pitch as is evident from FIGS. 1 and 2. The ends of the roll adjustment shaft 146 are provided with fixed actuator heads 158 and 160 each having hexagonal configuration that is adapted to receive a suitable hex wrench to enable selective rotation of the roll adjustment shaft 146 from either end thereof. Adjacent the fixed actuators the roll adjustment shaft 146 is rotatably supported by bushing elements 162 that are located within respective and wall apertures 144 and provide wear resistant support for the roll adjustment shaft.

A pair of quick-disconnect roll assemblies are provided as shown generally at 164 and 166.

Figure 4:
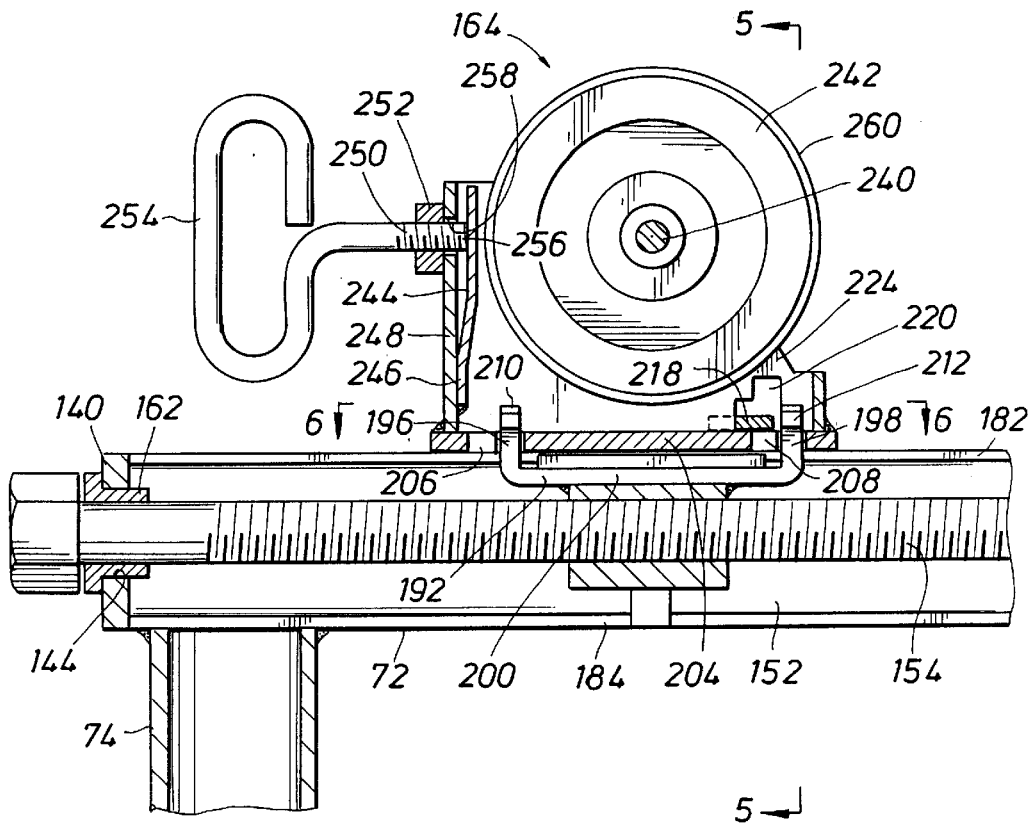
Figure 5:
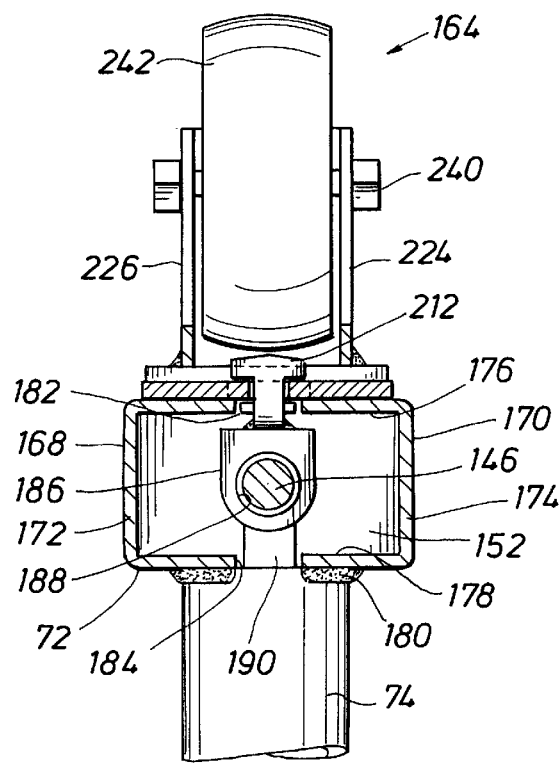

As shown in FIGS. 4 and 5 the support head 72 is defined by a pair of generally "U" shaped support housing elements 168 and 170 having side flanges 172 and 174 respectively and defining respective upper and lower flanges 176 and 178. The support housing elements or sections 168 and 170 are each welded or otherwise secured to the upper ends of the elevation posts 74 and 76. These "U" shaped support housing sections are positioned with the respective upper and lower flanges thereof disposed in laterally spaced relation as is shown best in FIG. 5 for the purpose of defining upper and lower longitudinal actuator guide slots 182 and 184 that extends substantially along the entirety of the respective upper and lower central regions of the support head 72.

Each support roller assembly 164 and 166, as shown particularly in FIGS. 1, 4, 5, and 7, is provided with a shaft follower 186 defining an internally threaded opening 188 within which is received a respective threaded section of the roller adjustment shaft 146. Extending downwardly from the shaft follower 186 is a guide tab 190 that extends into the lower longitudinal guide slot 184 of the horizontal support member. A generally "U" shaped roller connector member 192 is secured to the upper portion of the shaft follower 186 by means of a retainer plate 194 through which extend screws, roll pins or other suitable devices that secure the retainer and guide plate to the shaft follower. As is evident from FIGS. 4, 5, and 7, the retainer and guide plate 94 projects upwardly from the roller connector member 192 and is positioned within the upper longitudinal guide slot 182 and thus serves to additionally guide the shaft follower 186 as it is moved linear within the housing chamber 152 and the support member 72 by rotation of the roll adjustment shaft 146. At opposed ends of the "U" shaped roller connector 192 a pair generally "T" roller latch connectors 196 and 198 project upwardly from an intermediate horizontal portion 200 of the roller connector member 192. These "T" shaped connector tab members project upwardly beyond the upper surface 202 of the support member so as to be positioned for latching engagement with a respective one of the roll assemblies.

Each of the roll assemblies 164 and 166 further includes a roll base plate 204 which defines a pair of openings 206 and 208 of a dimension and configuration for permitting the enlarged upper head portions 210 and 212 of the "T" shaped latch connector tabs 196 and 198 to pass therethrough as the roll assembly is brought into latching engagement with the shaft follower mechanism. The latch openings 206 and 208 of the base plate 204 define laterally opening recesses 214 and 216 which extend to one side of the respective latch openings as is evident particularly from FIGS. 6, 7, and 8. After the base plate 204 has been positioned as shown in 7, with the latch connector tabs 196 and 198 projecting therethrough, the base plate 204 is shifted laterally to the left from the position of FIG. 7 to the position of FIG. 6 thus locating the enlarged heads 210 and 212 of the latch connectors in positions overlying portions of the base plate structure. Thus, in the position shown in FIG. 6, the base plate 204 is secured in releasable assembly with the shaft follower mechanism 186 by the head portions 210 and 212 of the connector tabs. When so connected, as the shaft follower assembly 186 is moved linearly upon rotation of the roll adjustment shaft 146, the base plate 204 will travel linearly along the upper surface of the support member 72 by virtue of its connection to the shaft follower by the connector tabs 196 and 198. By virtue of the oppositely pitched threaded sections of the roll adjustment shaft 146, the roll assemblies will either be moved toward one another or away from one another depending upon the direction of shaft rotation to enable proper positioning of the roll assemblies to accommodate work-pieces of a particular dimension.

For the purpose of locking the base plate 204 in driven assembly with the shaft follower mechanism there is provided a latch key member 718 having its respective ends extending through latch key apertures 220 and 222 that are defined by respective side walls 224 and 226 of a generally rectangular roll housing 228 that is fixed to and extends upwardly from the base plate 204. The latch key 218 is rotatably positionable between a generally horizontal latching position as shown in FIG. 6 and in upstanding release position as shown in FIG. 8. The latch key 218 defines a pair recesses 230 and 232 of sufficient width and spacing to receive portions of the roll housing walls 224 and 226 therein to thereby allow the latch key to be positionable substantially horizontally as shown in FIG. 6. In this horizonal position a locking edge 234 of the latch key is positioned to prevent movement of the connector tabs to the release position shown in FIG. 7. Thus, in the condition shown in FIG. 6, the latch key secures the base plate to the shaft follower mechanism and prevents the roll assembly from becoming inadvertently disassembled from the shaft follower.

To release the connection of the roll assembly with the shaft follower, the latch key 218 is rotated clockwise from the position shown in FIG. 6 to the upstanding position shown in FIGS. 7 and 8. In this upstanding position the latch key is shifted laterally by virtue of the "L" shaped latch key apertures so that its reduced dimension sections 236 and 238 are positioned in the lateral offset of the respective latch key apertures as shown in particularly in FIG. 7. When the latch key is positioned in an upstanding manner as shown in FIGS. 7 and 8, the base plate 204 maybe shifted laterally relative to the retainer and guide plate 194 of the shaft follower 186 so as to position the latch openings in registry with the latch connector tabs to permit passage of the connector tabs therethrough and thus, allow upward movement of the roll assembly during releasing movement thereof from the shaft follower mechanism. Thus, the roll assemblies 164 and 166 maybe assembled to or released from the support member as desired without necessitating the use of tools. This feature enables users to easily change out the roll assemblies in the event rollers of different character, i.e., material or material hardness, might be desirable for support of particular round objects.

The side walls 224 and 226 of each of the roll housings define registering apertures through which extend an axle 240 which may conveniently take the form of a bolt and nut assembly and which provides for rotatable mounting of a load engaging and supporting roller member 242. The roller member may be composed of metal, resilient material, elastomeric material etc., depending upon the characteristics of the elongate round member to be supported for rotation thereby. Additionally, to stabilize the round work piece when it has reached a desired position by rotation on the spaced rollers, a brake pad 244, which maybe composed resilient material, spring-like metal or the like is movable into braking engagement with the roller 242. The brake pad defines an attachment end 246 that is fixed to the inside surface of an end wall 248 of the roller housing. For actuation of the brake pad member, a threaded pin 250 is received by an internally threaded drive nut 252 that is also fixed to the end wall 248 of the housing. The brake actuating pin 250 is provided with a handle extension 254 for its manual actuation and is provided with an actuating extremity 256 that extends through an aperture 258 of the housing end wall and is disposed for actuating engagement with the brake pad member 244. Thus, by rotating a handle extension 254 of the threaded pin 250 the brake pad 244 is moved into braking engagement with the outer cylindrical surface 260 of the roller. When rotation of the roller is prevented by brake pad engagement, the round work-piece being supported by the spaced rollers is also stabilized against rotation so that desired work activity may be performed on the work-piece with the work-piece positioned as selected.

Referring now to FIG. 9, an alternative embodiment of this invention is shown generally at 262 which differs from the embodiment of FIGS. 1–8 only in that the support base thereof, shown generally at 264, is of rigid construction rather than being collapsible. A pair of tubular members 266 and 268 are connected at respective upper ends thereof to the ends 270 and 272 of a transverse structural element 274. The tubular members are maintained in substantially parallel relation by the transverse structural member and by a horizontal stabilizer bar 276, having its ends 278 and 280 fixed by welding or by other suitable means at or near the lower ends of the respective tubular members. The transverse structural element and the horizontal stabilizer bar 276 define a generally rectangular base frame which is supported by a plurality of rigidly connected support leg members.

Pairs of support legs 282 and 284 have upper ends 286 and 288 thereof fixed to the tubular members 266 and 268, with the pairs of legs being inclined with respect to the tubular members and positioned in substantially the same angular orientation as the collapsible legs shown in FIG. 2. Transverse brace members 290 have respective ends thereof welded or otherwise connected in fixed relation to the respective tubular members 266 and 268 and to the support leg members as shown.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. An adjustable roll and support mechanism for rotatable support of elongate objects having a round cross-sectional configuration, comprising:
   (a) a support base having a pair of tubular members being disposed in generally parallel and spaced relation;
   (b) support leg members projecting downwardly from respective tubular members and being oriented in angular relation with respective tubular members;
   (c) a pair of elevation posts having lower portions thereof received in telescoping relation within respective tubular members;
   (d) a roll positioning head being fixed to said elevation posts and having a roll positioning mechanism; and
   (e) a pair of roll assemblies having driven connection with said roll positioning mechanism and being disposed in force transmitting relation with said roll positioning head, said roll assemblies each having a work engaging roller disposed for rotatable supporting engagement with an elongate object of round cross-section.

2. The adjustable roll and support mechanism of claim 1, wherein:

said roll assemblies each being in releasable assembly with said roll positioning mechanism and having a manually operable brake for rotatably positioning an object rotatably supported thereby.

3. The adjustable roll and support mechanism of claim 1, wherein said roll positioning mechanism comprises:

(a) a pair of shaft followers each having guided relation with said roll positioning head;

(b) a roll positioning shaft being rotatably supported by said roll positioning head and having driving connection with said shaft followers for moving said shaft followers toward one another or away from one another depending upon the direction of shaft rotation, said roll adjustment shaft having a drive portion being positioned for manual actuation to achieve roll positioning rotation of said roll positioning shaft.

4. The adjustable roll and support mechanism of claim 3, wherein:

(a) said roll positioning shaft having spaced threaded sections of opposing pitch; and (b) said shaft followers each having an internally threaded driven members having threaded engagement respectively with one of said spaced threaded sections of said roll positioning shaft.

5. The adjustable roll and support mechanism of claim 4, wherein each of said shaft followers comprise:

(a) a follower body defining an internally threaded bore being disposed in threaded engagement with a respective one of said threaded sections of said roll adjustment shaft;

(b) a roll connector element being fixed to said follower body and defining at least one connector projection; and (c) a quick release locking mechanism releasably securing said connector projection in driving connection with a respective one of said roll assemblies.

6. The adjustable roll and support mechanism of claim 5, wherein said quick release locking mechanism comprises:

(a) said roll assemblies each having a base member disposed in movable load transferring relation with said roll positioning head, said base member defining at least one latch connector opening;

(b) said connector projection being received in mechanically interlocked relation within said latch connector opening; and (c) a latch key being disposed in movable assembly with said roll assembly and being movable from a latched position preventing movement of said connector projection from said latch connector opening to an unlatched position allowing movement of said connector projection from said latch connector opening.

7. The adjustable roll and support mechanism of claim 6, wherein:

(a) said roll assemblies each having a roll housing being fixed to said support base and defining housing side walls, said housing side walls each defining a latch key aperture; and (b) said latch key being of elongate configuration and having end portions being movably received within respective latch key apertures.

8. The adjustable roll and support mechanism of claim 3, wherein:

(a) said roll positioning head defining a support housing having an internal chamber and defining at least one longitudinal follower guide slot;

(b) said roll positioning shaft defining oppositely pitched threaded sections and being supported for rotation within said support housing, said roll positioning shaft having at least a portion thereof positioned externally of said support housing for selective manual roll positioning rotation;

(c) a pair of shaft followers each being located within said support housing of said roll positioning head and having guided relation with said longitudinal follower guide slot, said shaft followers each having driven threaded connection with respective threaded sections of said roll positioning shaft and having roll connectors extending through said longitudinal follower guide slot; and (d) said roll assemblies each having releasable assembly with said shaft connectors of respective shaft followers.

9. The adjustable roll and support mechanism of claim 1, wherein said roll positioning mechanism comprises:

(a) a roll positioning shaft defining end portions;

(b) said roll positioning head being of elongate configuration and defining end walls and defining an upwardly opening longitudinal slot extending substantially the entire length thereof, said end walls defining apertures within which ends of said roll positioning shaft are rotatably supported; and (c) shaft drive elements being fixed to respective ends of said roll positioning shaft and being located externally of said end walls.

10. The adjustable roll and support mechanism of claim 1, wherein said support base comprises:

(a) a transverse structural member defining ends being fixed to said tubular elements and maintaining upper ends of said tubular elements in fixed and spaced relation to one another; and (b) lock ring assemblies being mounted to said tubular elements and having lock rings being disposed about said elevation posts, said lock rings being positionable at a locking position to restrain downward movement of said elevation posts relative to said tubular members and being positionable at a release position permitting downward movement of said elevation posts relative to said tubular members.

11. The adjustable roll and support mechanism of claim 10, wherein:

an elevation lock actuator being movably supported by said transverse structural member and being movable to a position engaging said lock rings and moving said lock rings to said release positions thereof.

12. The adjustable roll and support mechanism of claim 10, wherein:

positive lock mechanisms being supported by said tubular members and having positive lock elements being movable to positions engaging respective elevation posts and locking said elevation posts against both upward and downward movement relative to said tubular members.

13. The adjustable roll and support mechanism of claim 12, wherein said positive lock mechanisms each comprises:

(a) lock control elements being fixed to each of said tubular members and having side panels, said lock control elements defining a lock ring slot receiving a portion of a lock ring therein, said side panels defining lock nut apertures;

(b) a lock nut being non-rotatably supported by each of said lock control elements; and (c) a lock pin being threadedly received by said lock nut and being driven linearly by said drive nut upon rotation of said lock pin for linear locking and unlocking movement thereof relative to said elevation posts.

14. The adjustable roll and support mechanism of claim 1, wherein said support leg members comprise:
   (a) a pair of pivot mounts being fixed to each of said tubular members;
   (b) a support leg being pivotally connected to each of said pivot mounts and being pivotally movable from a collapsed position to an extended position;
   (c) a stabilizer ring member being movably positioned about each of said tubular members; and
   (d) connector links having ends being pivotally connected to said stabilizer ring member and to respective support legs, said connector links determining the positions of said support legs at said collapsed and extended positions thereof.

15. The adjustable roll and support mechanism of claim 14, wherein:
   a stabilizer bar having ends thereof disposed in fixed relation with said stabilizer rings and ensuring substantially parallel positioning of said tubular members.

16. The adjustable roll and support mechanism of claim 1, wherein said support leg members comprise:
   a pair of support legs being fixed to each of said tubular members, each of said support legs having upper and lower ends, said upper ends being fixed to said tubular members and said lower ends having foot pads for engaging a surface upon which said adjustable roll and support mechanism rests;
   (b) transverse brace members being fixed to said tubular elements and said support legs; and
   (c) a horizontal stabilizer bar having ends thereof fixed to respective tubular members and assisting in maintaining said tubular members in substantially parallel relation.

17. An adjustable roll and support mechanism for rotatable support of elongate objects having a round cross-sectional configuration, comprising:
   (a) a support base having a pair of tubular members being disposed in generally parallel and spaced relation;
   (b) support leg members projecting downwardly from respective tubular members and being oriented in angular relation with respective tubular members;
   (c) a pair of elevation posts having lower portions thereof received in telescoping relation within respective tubular members;
   (d) an elongate roll positioning head having end portions being fixed to said elevation posts, said roll positioning head defining an upwardly facing longitudinal slot;
   (e) a roll positioning shaft being rotatably supported by said elongate roll positioning head and having threaded sections having threads of opposite pitch from one another;
   (f) a pair of follower assemblies having threaded connection with respective threaded sections of said roll positioning shaft, each of said follower assemblies having at least one roll connector projecting through said upwardly facing longitudinal slot; and
   (g) a pair of roll assemblies having releasable driven connection with a respective roll connector and being disposed in force transmitting relation with said roll positioning head, said roll assemblies each having a work engaging roller disposed for rotatable supporting engagement with an elongate object of round cross-section.

18. The adjustable roll and support mechanism of claim 17, wherein each of said shaft followers comprise:
   (a) a follower body defining an internally threaded bore being disposed in threaded engagement with a respective one of said threaded sections of said roll adjustment shaft;
   (b) a roll connector element being fixed to said follower body and defining at least one connector projection; and
   (c) a quick release locking mechanism releasably securing said connector projection in driving connection with a respective one of said roll assemblies.

19. The adjustable roll and support mechanism of claim 18, wherein said quick release locking mechanism of each of said roll assemblies comprises:
   (a) a base member disposed in movable load transferring relation with said roll positioning head, said base member defining at least one latch connector opening;
   (b) said connector projection being received in mechanically interlocked relation within said latch connector opening; and
   (c) a latch key being disposed in movable assembly with said roll assembly and being movable from a latched position preventing movement of said connector projection from said latch connector opening to an unlatched position allowing movement of said connector projection from said latch connector opening.

20. The adjustable roll and support mechanism of claim 19, wherein:
   (a) said roll assemblies each having a roll housing being fixed to said base member and defining housing side walls, said housing side walls each defining a latch key aperture; and
   (b) said latch key being of elongate configuration and having end portions being movably received within respective latch key apertures.

21. The adjustable roll and support mechanism of claim 17, wherein:
   (a) said roll positioning shaft defining end portions;
   (b) said roll positioning head being of elongate configuration and defining end walls and defining an upwardly opening longitudinal slot extending substantially the entire length thereof, said end walls defining apertures within which ends of said roll adjustment shaft are rotatably supported; and
   (c) shaft drive elements being fixed to respective ends of said roll positioning shaft and being located externally of said end walls.

22. The adjustable roll and support mechanism of claim 17, wherein said support base comprises:
   (a) a transverse structural member defining ends being fixed to said tubular elements and maintaining upper ends of said tubular elements in fixed and spaced relation to one another;
   (b) lock ring assemblies being mounted to said tubular elements and having lock rings being disposed about said elevation posts, said lock rings being positionable at a locking position to restrain downward movement of said elevation posts relative to said tubular members and being positionable at a release position permitting downward movement of said elevation posts relative to said tubular members; and (c) an elevation lock actuator being movably supported by said transverse structural member and being movable to a position engaging said lock rings and moving said lock rings to said release positions thereof.

23. The adjustable roll and support mechanism of claim 22, wherein:

positive lock mechanisms being supported by said tubular members and having positive lock elements being movable to positions engaging respective elevation posts and locking said elevation posts against both upward and downward movement relative to said tubular members.

24. The adjustable roll and support mechanism of claim 23, wherein said positive lock mechanisms each comprises:

(a) lock control elements being fixed to each of said tubular members and having side panels, said lock control elements defining a lock ring slot receiving a portion of a lock ring therein, said side panels defining lock nut apertures;

(b) a lock nut being non-rotatably supported by each of said lock control elements; and (c) a lock pin being threadedly received by said lock nut and being driven linearly by said drive nut upon rotation of said lock pin for linear locking and unlocking movement thereof relative to said elevation posts.

25. The adjustable roll and support mechanism of claim 17, wherein said support leg members comprises:

(a) a pair of pivot mounts being fixed to each of said tubular members;

(b) a support leg being pivotally connected to each of said pivot mounts and being pivotally movable from a collapsed position to an extended position;

(c) a stabilizer ring member being movably positioned about each of said tubular members; and (d) connector links having ends being pivotally connected to said stabilizer ring member and to respective support legs, said connector links determining the positions of said support legs at said collapsed and extended positions thereof.

26. The adjustable roll and support mechanism of claim 25, wherein:

a stabilizer bar having ends thereof disposed in fixed relation with said stabilizer rings and ensuring substantially parallel positioning of said tubular members.

27. The adjustable roll and support mechanism of claim 17, wherein:

at least one of said roll assemblies having a manually operable roll brake for stopping rotation of said roller thereof and selectively rotatably positioning the elongate object being rotatably supported thereby.

* * * * *